United States Patent
Swen et al.

[11] Patent Number: 5,806,081
[45] Date of Patent: Sep. 8, 1998

[54] METHOD AND SYSTEM FOR EMBEDDING A DEVICE PROFILE INTO A DOCUMENT AND EXTRACTING A DEVICE PROFILE FROM A DOCUMENT IN A COLOR MANAGEMENT SYSTEM

[75] Inventors: Iue-Na Steve Swen; Michael D. Stokes, both of Cupertino, Calif.; Thomas E. Mohr, Portland, Oreg.

[73] Assignee: Apple Computer Inc., Cupertino, Calif.

[21] Appl. No.: 604,208

[22] Filed: Feb. 16, 1996

Related U.S. Application Data

[63] Continuation of Ser. No. 270,512, Jul. 1, 1994, abandoned.
[51] Int. Cl.⁶ .................................. G06F 3/14; H04N 1/46
[52] U.S. Cl. ........................ 707/528; 345/431; 345/150; 345/186; 345/22; 358/515; 358/527
[58] Field of Search ..................................... 382/209, 276; 395/429, 431; 707/528; 345/431, 150, 199, 22, 186; 358/515, 527

[56] References Cited

U.S. PATENT DOCUMENTS

| | | | |
|---|---|---|---|
| 4,839,828 | 6/1989 | Elsner et al. | 364/518 |
| 4,907,071 | 3/1990 | Belmares-Serabia et al. | 358/22 |
| 4,985,759 | 1/1991 | Ito | 358/79 |
| 5,175,628 | 12/1992 | Jamzadeh et al. | 358/300 |
| 5,208,911 | 5/1993 | Newman et al. | 395/162 |
| 5,212,546 | 5/1993 | Arazi et al. | 358/80 |
| 5,243,414 | 9/1993 | Dalrymple et al. | 358/500 |
| 5,257,097 | 10/1993 | Pineau et al. | 358/500 |
| 5,271,096 | 12/1993 | Cook | 395/131 |
| 5,282,026 | 1/1994 | Nagata | 358/500 |
| 5,309,257 | 5/1994 | Bonino et al. | 358/504 |
| 5,319,473 | 6/1994 | Harrington | 358/501 |
| 5,339,176 | 8/1994 | Smilansky et al. | 358/504 |
| 5,349,452 | 9/1994 | Maeda et al. | 358/527 |
| 5,367,387 | 11/1994 | Yamaguchi | 358/518 |
| 5,375,193 | 12/1994 | Adams, Jr. | 395/131 |
| 5,379,049 | 1/1995 | Leach | 345/22 |
| 5,446,543 | 8/1995 | Nakagawa | 356/405 |
| 5,497,431 | 3/1996 | Nakamura | 382/162 |
| 5,524,069 | 6/1996 | Inoue | 382/270 |
| 5,557,688 | 9/1996 | Nakamura | 382/164 |

FOREIGN PATENT DOCUMENTS 9430003  12/1994  WIPO.

OTHER PUBLICATIONS

"Generic Architecture for Color Data Interchange", W.J. Donovan, et al., IS&T 46th Annual Conference, May 1993 Springfield, VA, USA, pp. 139–141.
"Consistent Color", M. Sugihara, Byte, vol. 20, No. 1, Jan. 1995, St. Peterborough, US, pp. 93–100.
"Colorsync Utilities", Inside Macintosh, Developer Technical Publications, Apple Computer, Inc. 1993, pp. 1–1 thru 1–75.
Adobe Systems, Inc.; *PostScript Language Reference Manual*; Ch. 4 & 6; pp. 184–201, 293–309; 1990.
James D. Foley, et al.; *Computer Graphics: Principles and Practice*; 2nd Edition pp. 578–603; Addison–Wesley; 1987.
*CRC Standard Mathematical Tables*; 25th Edition; pp. 24–29; CRC Press, Inc.; 1978.
Apple Computer, Inc.; *ColorSync Utilities*; Developer Technical Publications; Jul. 15, 1993.

*Primary Examiner*—Thomas G. Black
*Assistant Examiner*—Jean R. Homere
*Attorney, Agent, or Firm*—Nancy R. Simon

[57] ABSTRACT

A method and system for embedding a device profile into a document and extracting a device profile from a document in a color management system. A tagged-element device profile allows for selective access to the device profile. The method of embedding a device profile into a document include allocating memory for a buffer, sending a ready call, transferring the device profile or portions of the device profile into the buffer and writing the same in the document, and lastly, sending a completed call. The method of extracting a device profile from a document includes allocating memory for a buffer, sending a ready call, reading the device profile or portions of the device profile from the document into the buffer and transferring the same to a file, and finally, sending a completed call.

25 Claims, 11 Drawing Sheets

METHOD AND SYSTEM FOR EMBEDDING A DEVICE PROFILE INTO A DOCUMENT AND EXTRACTING A DEVICE PROFILE FROM A DOCUMENT IN A COLOR MANAGEMENT SYSTEM

This is a continuation of application Ser. No. 08/270,512, filed Jul. 1, 1994, now abandoned.

BACKGROUND OF THE INVENTION

1. Field of the Invention

The present invention relates in general to computer systems, and in particular to color management systems operating in computer systems. Still more particularly, the present invention relates to a method and system for embedding a device profile into a document and extracting a device profile from a document in a color management system.

2. Description of the Prior Art

Color management refers to a system that supports color information exchange, color matching, profile management, and device calibration. As color input, display and output devices for computer systems proliferate, the need for color management increases. This is due to several factors. First, differing device types operate in different color spaces. For example, color display monitors typically display colors as combinations of red, green, and blue, and are said to work in the RGB color space. Printers typically print images as combinations of cyan, magenta, yellow and black, and are said to work the CMYK color space.

Another factor is that different color devices have different color capabilities. Every color device, such as a scanner, printer, or monitor, has a range of colors that it can produce. This range of produceable colors is known as a gamut. Those skilled in the art will recognize that color display monitors can produce and display hundreds to thousands of colors. Color printers, however, have a smaller number of printable colors. Consequently, in most situations the gamut for a color display monitor exceeds the gamut for a color printer. As a result, some colors displayed on display monitor can not be produced by a color printer.

A third factor is that devices of the same type that are manufactured by different manufacturers may produce different colors, or intensities of the same colors, for the same color data. For example, color display monitors made by different manufacturers may display different colors, or intensities of the same colors, for the same RGB values. Print technologies vary drastically, and the gamut that an ink jet color printer can print may be quite different from a printer based on a different technology, such as a color laser printer. A single printer may have different gamuts depending on the paper or ink being used at the time of printing.

The way colors are sampled in different devices is another factor. Generally, the method used by monitors to display color follows the laws of additive color mixture. Additive color mixture adds the color together to yield the result. Additive color mixture moves a color toward white, and usually results in vivid images. Printers, however, typically follows the laws of subtractive color mixture. In subtractive color mixture, color data specifies how much of a certain color to remove from white to yield the result. Consequently, a subtractive color mixture moves colors toward black or dark gray.

A color management system offers the means of transmitting color images and documents across local and wide area networks while maintaining the fidelity of the colors of the original image or document as much as possible. In January, 1993, Apple Computer, Inc. introduced ColorSync™ 1.0, a color management system in the form of a suite of utilities. The ColorSync™ Utilities are a set of routines and data structures that enable a color processing system to match colors and communicate color information between various source and destination devices. Color information is transmitted between devices via a device profile. A device profile is a data structure that describes the basic color characteristics of the device. Color information described in a device profile includes data relating to the device's color space, gamut, tonal reproduction curves, and the preferred color matching method (CMM).

Color matching means converting colors between differing gamuts. A CMM implements algorithms to match colors. Because the ColorSync™ Utilities are designed to provide an "open system" for color management, developers can use an Apple-supplied default CMM, create their own CMM, or obtain them from companies or vendors who create CMMs.

The ColorSync™ Utilities provide applications or device drivers with several tools for matching colors between devices. The tools include a default system color profile that describes the gamut of the Apple™ RGB 13 inch monitor, a control panel interface by which users can set their system profile, a means of specifying and obtaining device profiles for other devices, a means of associating device profiles with images or documents, an Apple-supplied default CMM, a folder for storing device profiles, and an open architecture that allows developers to create or obtain a custom CMM and associate it with a device profile.

Device profiles in ColorSync™ 1.0 are memory resident, meaning a profile is read into random access memory (RAM) when information regarding data within the device profile is needed or when the device profile is being used by the ColorSync™ Utilities. In order to do this, computer systems must have a sufficient amount of RAM to hold the entire device profile while one or more application software programs are running in the computer system.

The requirement to load the entire device profile into RAM adversely affects the performance and resource requirements of the computer system. This is due to the fact that as the size of device profiles increase, more and more RAM is needed in order to access or use the device profile. Consequently, an undesirable amount of RAM is consumed by the device profile, or the device profile is not used because the computer system does not have sufficient RAM.

Additionally, a user may wish to embed a device profile into a document. Embedding a device profile is a means of associating a device profile with documents. The device profile travels with the document and is available for reference at a later time when the document is accessed. To obtain the device profile from the document, the device profile must first be extracted from the document. ColorSync 1.0, however, does not provide the functionality to embed or extract a device profile from a document. Furthermore, if it did, the issue of RAM usage could possibly limit the ability to perform these tasks.

SUMMARY OF THE INVENTION

A method and system for embedding a device profile into a document and extracting a device profile from a document in a color management system. A tagged-element device profile allows for selective access to the device profile. The method of embedding a device profile into a document includes allocating memory for a buffer, sending a ready call, transferring the device profile or portions of the device profile into the buffer and writing the same in the document, and lastly, sending a completed call. The method of extracting a device profile from a document includes allocating memory for a buffer, sending a ready call, reading the device profile or portions of the device profile from the document into the buffer and transferring the same to a file, and finally, sending a completed call.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
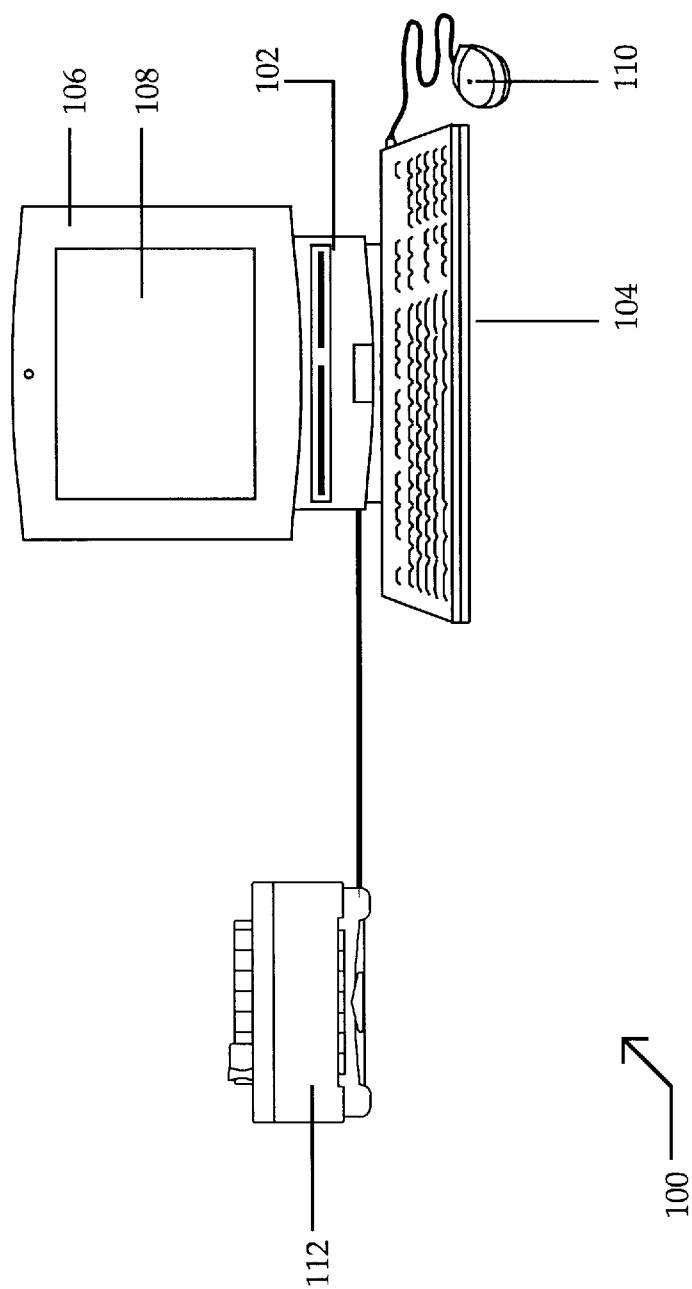
FIG. 1 illustrates a computer system which may be used to implement the method and system for dynamically dispatching device profile data in a color management system according to the present invention.

With reference now to the figures and in particular with reference to FIG. 1, a computer system is illustrated which may be used to implement the method and system for dynamically dispatching device profile data in a color management system according to the present invention. Computer system 10 includes a computer 12, keyboard 14, a color display monitor 16 having a display screen 18, a cursor control device 20, shown here as a mouse, and a printer 22. Computer system 10 may be implemented using any suitable computer, such as a Macintosh Quadra™ computer, a product of Apple Computer, Incorporated, located in Cupertino, Calif. Printer 22 is a color printer, such as a Color Stylewriter Pro™ printer, also a product of Apple Computer, Incorporated.

One of the utilities available in computer system 10 is ColorSync™ 2.0, a product created by Apple Computer, Incorporated. ColorSync™ 2.0 is a color management tool that supports color information exchange, color matching, device profile management, and device calibration. Color matching is important when transferring color images and documents between color devices, such as monitors and printers. Color matching is necessary because color devices have different color capabilities, describe color in different terms and operate in different color spaces.

For example, a color display monitor 16 in computer system 10 creates and describes colors in terms of red, green and blue ("rgb") values, and is said to work in the RGB color space. The rgb values for display monitor 16 are device dependent, meaning the rgb values are particular for that monitor. Because the rgb values are device dependent, colors displayed on a different monitor will probably not match the colors displayed on display monitor 16 for the same rgb values.

Most printers create and describe colors in device dependent terms differing from monitors. Printers use cyan, magenta, yellow and black ("cmyk") values to describe colors, and are said to work in the CMYK color space. Again, because the cmyk values are device dependent, colors printed on printer 22 will probably not match colors printed on a different printer for the same cmyk values.

The need for color matching is further supported by the fact that different color devices have different color capabilities. Every color device, such as a scanner, printer, or monitor, has a range of colors that it can produce. This range of produceable colors is known as a gamut. Those skilled in the art will recognize that color display monitors can produce and display hundreds to thousands of colors. Color printers, however, have a smaller number of printable colors. Consequently, in most situations the gamut for a color display monitor exceeds the gamut for a color printer. As a result, some colors displayed on display monitor 16 can not be produced by printer 22.

Finally, the way colors are sampled in different devices also increases the need for color matching. Generally, the method used by monitors to display color follows the laws of additive color mixture. Additive color mixture adds the color together to yield the result. Additive color mixture moves a color toward white, and usually results in vivid images. Printers, however, typically follows the laws of subtractive color mixture. In subtractive color mixture, color data specifies how much of a certain color to remove from white to yield the result. Consequently, a subtractive color mixture moves colors toward black or dark gray.

Figure 2:
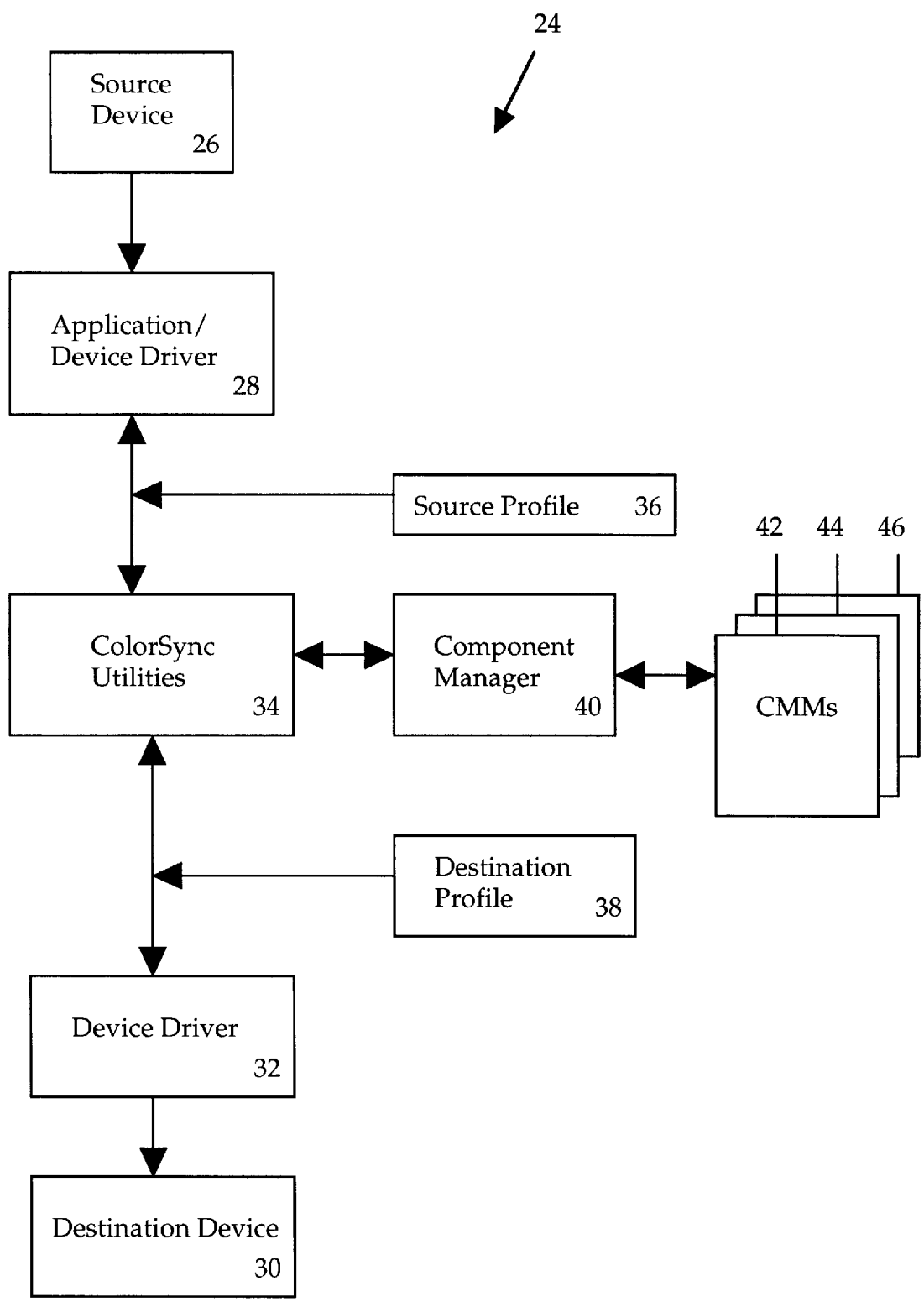
FIG. 2 is a block diagram depicting the architecture of a color processing system according to the present invention.

FIG. 2 is a block diagram depicting the architecture of a color processing system according to the present invention. Color processing system 24 includes a source device 26. Source device 26 is a device used to input a document or image into color processing system 24. For example, source device 26 can be a color display monitor, a scanner or other real or virtual devices, such as a camera or color composition routines. Block 28 represents a device driver associated with source device 26 or an application software program being used by a user to access the input document or image.

Color processing system 24 further includes a destination device 30. Examples of destination devices include a printer, a color monitor, or other real or virtual devices such as a plotter or color composition routines. Device driver 32 is associated with destination device 30.

When a user wants color processing system 24 to perform color matching on an image or document, the application software program or the device driver shown in blocks 28 or 32 calls ColorSync™ Utilities 34. The ColorSync™ Utilities 34 are a set of routines and data structures that enable color processing system 24 to match colors and communicate color information between the various source and destination devices. Color information is transmitted between devices via a device profile. A device profile is a data structure that describes the basic color characteristics of the device. Color information described in a device profile includes data relating to the device's color space, gamut, tonal reproduction curves, and the preferred color matching method (CMM). The structure and contents of a device profile will be described in greater detail with reference to FIG. 4.

Still referring to FIG. 2, color processing system 24 preferably has at least two device profiles. Source profile 36 is associated with source device 26. If color processing system 24 has a plurality of source devices, each source device may have its own source profile. Destination profile 38 is associated with destination device 30. If color processing system 24 has a plurality of destination devices, each destination device may have its own destination profile. Profiles can reside in files, device drivers, applications, documents, and images. Although FIG. 2 depicts only one source profile and one destination profile, more than two profiles may reside in color processing system 24.

Finally, color processing system 24 includes a component manager 40 and at least one color matching method (CMM). Blocks 42, 44, 46 represent three different CMMs within color processing system 24. The Apple™ Color Matching Method included with ColorSync™ is one of the CMMs in color processing system 24. A CMM is where the conversion, or color matching, between differing color gamuts occurs.

Components are called through component manager 40. In this manner, applications and device drivers are considered "clients." A component is a piece of code that provides a defined set of services to one or more clients. A component typically provides a specific type of service to its clients. For example, a component might provide image compression or decompression. A client would call the component, provide the component with the image, and the component would then compress the image and return the compressed image to the application. Multiple components can provide the same type of service. For example, separate components may exist that can compress an image by 20 percent, 40 percent, or 50 percent, with varying degrees of fidelity.

Component Manager 40 provides access to and management of components. An example of management of components is the tracking of the available components and routing requests to the appropriate component. The component manager 40 classifies components by three main criteria: the type of service provided, the level of service provided, and the component manufacturer. Component manager 40 uses a component type, consisting of a sequence of four characters, to identify the type of service provided by a component. CMMs have a component type of 'CMM_'. The Apple-supplied CMM component has a subcomponent type of 'appl'. Manufacturers and suppliers of other CMMs who register their CMM with Apple Computer, Inc. are assigned a subcomponent type.

Component Manager 40 provides services that allow clients to obtain run-time location of and access to functional objects by creating an interface between components and clients. A standard interface is used through which a client can communicate with all components of a given class, such as CMMs. Component Manager 40 is used to locate and communicate with components of that class. The components, in turn, provide the appropriate services to the client. A more detailed description of component manager 40 is found in Chapter 6 of *Inside Macintosh: More Toolbox Utilities* (1993) by Apple Computer, Inc.

Component manager 40 allows a single component to service multiple clients at the same time. Each client has a unique access path to the component. These access paths are called component connections. A component connection is identified by specifying a component instance. Component manager 40 provides the component instance to a client when it opens a connection to a component. The component maintains separately status information for each open connection.

Multiple clients may each open a connection to a component. Component manager 40 routes each client request to the component instance for that connection. Because a component can maintain separate storage for each connection, client requests do not interfere with each other and each client has full access to the services provided by the component.

With ColorSync™, color matching is the type of service provided to one or more clients. A separate ComponentInstance is opened for each matching session. The set of device profiles used in the matching session is unique for each session. The color matching component should allocate private storage to store the necessary information for the instance and use Component Manager functions to manage the storage. The color matching component should free the storage when the matching session is completed by making a ComponentClose function.

As stated above, CMMs have a component of the type 'CMM_' provide color matching services. All components of type 'CMM_' share a common interface, but each component may support a unique color matching technique or take advantage of a special hardware implementation. Individual components may support additions to the defined interface, as long as they support the common routines.

The color matching process will now be described by way of example. A color image is input into color processing system 24 by a scanner (source device) and is to printed on a color printer (destination device). The user wants the color in the image printed on the color printer to be matched as close a possible to the colors scanned by the scanner. The device driver shown in block 28 associated with the scanner calls the ColorSync™ Utilities 34. The ColorSync™ Utilities 34 examines the source profile 36 associated with the scanner and the destination profile 38 associated with the color printer to determine which CMMs should be used. The ColorSync™ Utilities 34 then calls Component Manager 40 to call one or more CMMs 42, 44, 46 to perform color matching. How many CMMs are called depends upon whether or not the source profile 36 and the destination profile 38 can use the same CMM for color matching. Once color matching is completed, the image is printed on the color printer.

Figure 3:
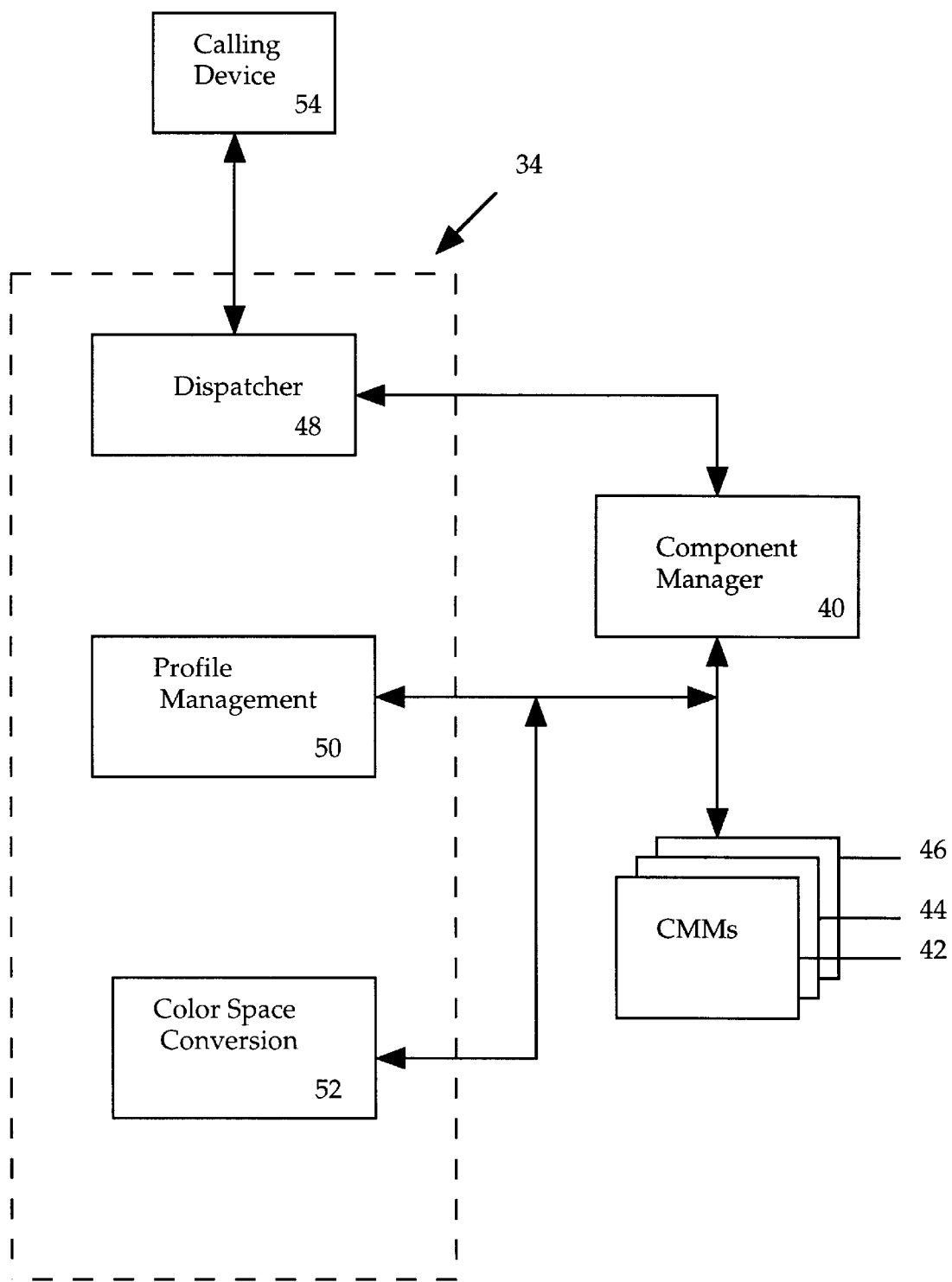
FIG. 3 is a block diagram illustrating the modular architecture of a color management system according to the present invention.

Referring to FIG. 3, a block diagram illustrates the modular architecture of a color management system according to the present invention. The ColorSync™ Utilities 34 include at least five components, or modules. These modules are dispatcher 48, profile management 50, color space conversion 52, CMMs 42, 44, 46, and device profiles (not shown).

Dispatcher 48 provides the overall color management administrative framework and manages the interaction between the color management system, including calling device 54, component manager 40, profile management 50, color space conversion 52, device profiles (not shown), CMMs 42, 44, 46, and the actual color image or document (not shown). Dispatcher 48 is installed from the Extensions file at system startup in the preferred embodiment. On 680×0 Macintosh™ computers, dispatcher 48 is implemented using the Toolbox A-trap mechanism. The interface defines the value for register D0 at the time a function is called. The A selector is in the low 16 bits and the parameter size is in the high 16 bits. The functions use PASCAL stack-based calling conventions. ColorSync™ 34 implements a 680×0 mainline function which internally dispatches individual calls on the selector.

The implementation of dispatcher 48 will vary for other computer systems. For example, dispatcher 48 is implemented on Power Macintosh™ computers by including a mechanism for internal dispatch of traps with a 68K register D0 selector. A function _SetTrapAddress is called with a pointer to a block of routine descriptors and selectors.

Profile management 50 provides searching, retrieval, and indexing functions for the various profiles, along with the ability to get and set individual attributes within a profile. Profile management 50 is registered at system startup with the following parameters.

|  |  |
|---|---|
| componentType | 'prof' |
| componentSubType | 'dflt' |
| componentManufacturer | 'appl' |

As discussed earlier, the Apple-supplied default CMM has a subcomponent type of 'appl'. Companies or vendors who create CMMs can register their CMMs with Apple and be assigned a subcomponent type.

Search specifications are defined by the following C language code and structure.

```
typedef
pascal
Boolean (*ProfileFilterProcPtr)(Profile prof, void *refCon);
#if USESROUTINEDESCRIPTORS
typedef UniversalProcPtr ProfileFilterUPP;
#else
typedef ProfileFilterProcPtr ProfileFilterUPP;
#endif
struct ProfileSearchRecord {
    OSType          CMMType;
    OSType          profileClass;
    OSType          deviceColorSpace;
    OSType          interchangeColorSpace;
    unsigned long   deviceManufacturer;
    unsigned long   deviceModel;
    unsigned long   deviceAttributes[2];
    unsigned long   profileFlags;
    unsigned long   searchMask;
    ProfileFilterUPP filter;
};
typedef struct ProfileSearchRecord  ProfileSearchRecord;
```

The bits of field "Mask" specify corresponding header fields which must match in the search.

|  |  |  |
|---|---|---|
| #define | kMatchProfileCMMType | 0x00000001 |
| #define | kMatchProfileClass | 0x00000002 |
| #define | kMatchDeviceSpace | 0x00000004 |
| #define | kMatchInterchangeSpace | 0x00000008 |
| #define | kMatchManufacturer | 0x00000010 |
| #define | kMatchModel | 0x00000020 |
| #define | kMatchAttributes | 0x00000040 |
| #define | kMatchProfileFlags | 0x00000080 |

The field "Filter" is a client function which can be used to search on elements outside the header of the device profile, or to implement AND or OR search logic. If "Filter" returns TRUE for a specific device profile, then it is excluded, or filtered, from the search.

Color space conversion 52 converts color data between various independent and derived color spaces. In the preferred embodiment, the following independent and derived color spaces are supported: CIEXYZ, CIELab, CIELuv, Yxy, RGB, HLS, HSV, GRAY, CMY, CMYK, and "Hi-fi" color, which is a special purpose multi-component color space intended for commercial printing with multiple inks. Color space conversion 52 preferably converts colors between color spaces within a color family. An example of a color family is CIEXYZ, CIELab, CIELuv and Yxy.

Figure 4:
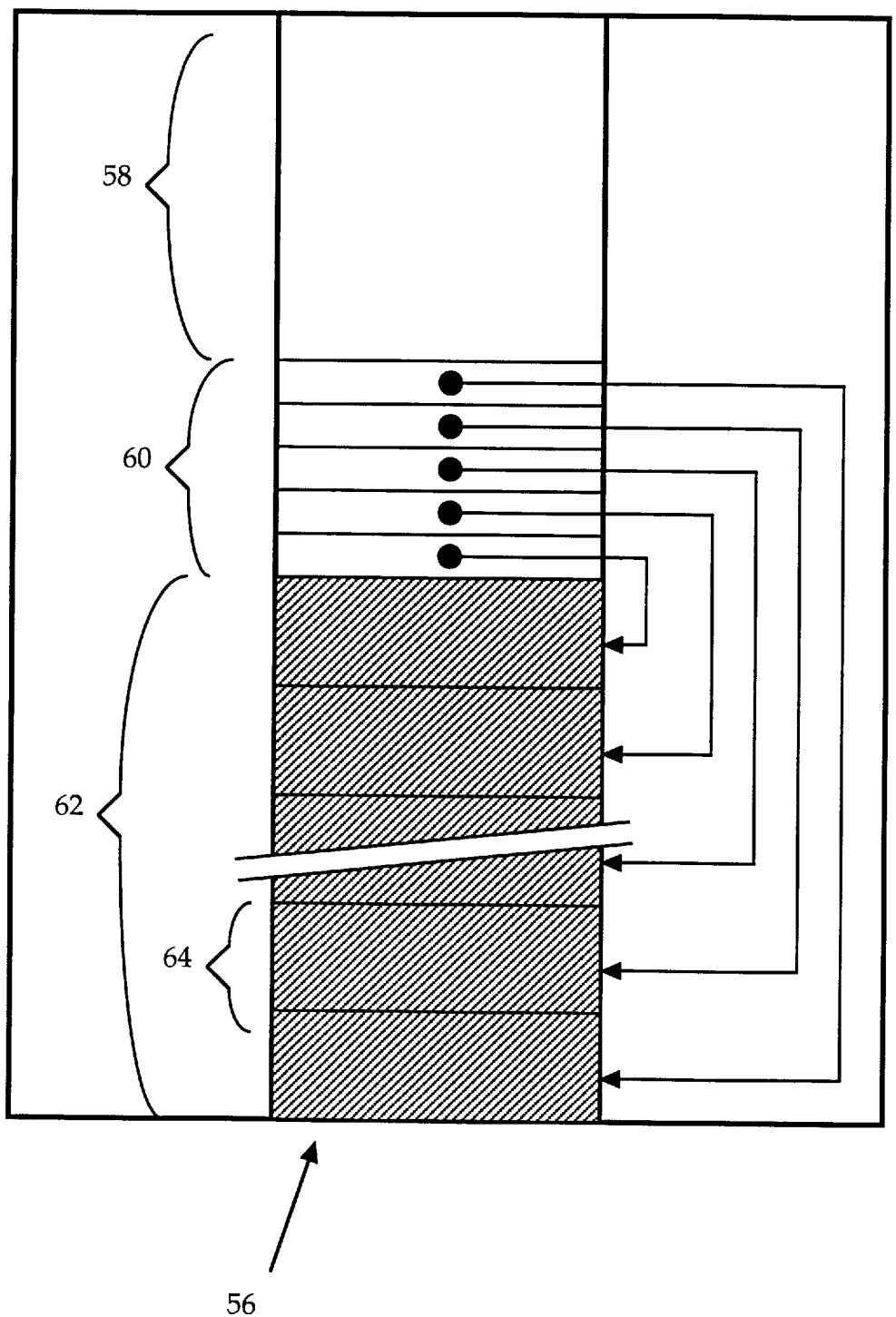
FIG. 4 is a pictorial representation of a device profile according to the present invention.

FIG. 4 is a pictorial representation of a device profile according to the present invention. A device profile 56 contains at least three sections, a header 58, a tag table 60, and tagged element data 62. Custom profiles may also have additional, private data. Appendix 1 describes in greater detail the types of profiles that may be used in the preferred embodiment. Appendix 1 is a top level view of what tags are required for each profile classification and a brief description of the algorithmic models associated with these classifications.

Header 60 defines a set of parameters at the beginning of device profile 56. In the preferred embodiment, header 58 has the following contents and size:

|  |  | bytes |
|---|---|---|
| struct CM2 Header { |  |  |
| unsigned long | size; | 0–3 |
| OSType | CMMType; | 4–7 |
| NumVersion | profileVersion; | 8–11 |
| OSType | profileClass; | 12–15 |
| OSType | dataColorSpace; | 16–19 |
| OSType | interchangeColorSpace | 20–23 |
| CMDateTime | dateTime; | 24–35 |
| OSType | CS2profileSignature; | 36–39 |
| OSType | platform; | 40–43 |
| unsigned long | flags; | 44–47 |
| OSType | deviceManufacturer; | 48–51 |
| unsigned long | deviceModel; | 52–55 |
| unsigned long | deviceAttributes[2]; | 56–63 |
| unsigned long | renderingIntent; | 64–67 |
| FixedXYZColor | white; | 68–79 |
| char | reserved[36];/*for future use*/}; | 80–127 |

The first eight bits of the profile version are the major version number and the next eight bits are for the minor version number. The platform flag indicates the primary platform/operating system of the device. The flags in bytes 44–47 are used to indicate various hints for the CMM such as distributed processing and caching options. The rendering intent may be one of four types in the preferred embodiment. The rendering intent types are perceptual, relative calorimetric, saturation and absolute colorimetric. Device attributes are attributes unique to the particular device setup such as media type. The profile class field indicates the type of device for which the profile is intended. Three standard types are:

|  |  |
|---|---|
| 'scnr' | input devices such as scanners and digital cameras |
| 'mntr' | display devices such as CRTs and LCDs |
| 'prtr' | output devices such as printers |

In addition to the three basic device profile classes, three additional color processing profiles may be used in the preferred embodiment. These profiles provide a standard implementation for use by the CMM in general color processing or for the convenience of CMMs which may use these types to store calculated transforms. These three profile classes are:

| 'link' | device link profiles |
| 'spac' | color space conversion profiles |
| 'abst' | abstract profiles |

Tag table 60 provides a table of contents to tagged element data 62 in device profile 56. Tag table 60 includes a tag signature, address and size for each tagged element data 62. A tag signature acts as a pointer to a specific element in tagged element data 62. In the preferred embodiment, a tag signature is defined as a four byte hexadecimal number.

Each tagged element data 62 is a piece of color information that a CMM can use to perform color matching or correction. Examples of tagged element data 62 include gray tone reproduction curve information and the tristimulus values for red, green, and blue. By using tag table 60, tagged element data 62 can be accessed randomly and individually. In this manner, a single element 64 within tagged element data 62 can be accessed and loaded into memory, thereby providing only the information necessary to perform a particular function or process of color matching or to present device information to a user. Providing device information to a user may be accomplished via a user interface implemented by the application or device driver.

Appendix 2 provides a list of the calls which can be used to access a profile. Appendix 3 specifies the individual tags which can be used in the preferred embodiment to create a profile. Appendix 4 specifies the type and structure definitions used in the preferred embodiment to create the individual tagged elements.

Figure 5:
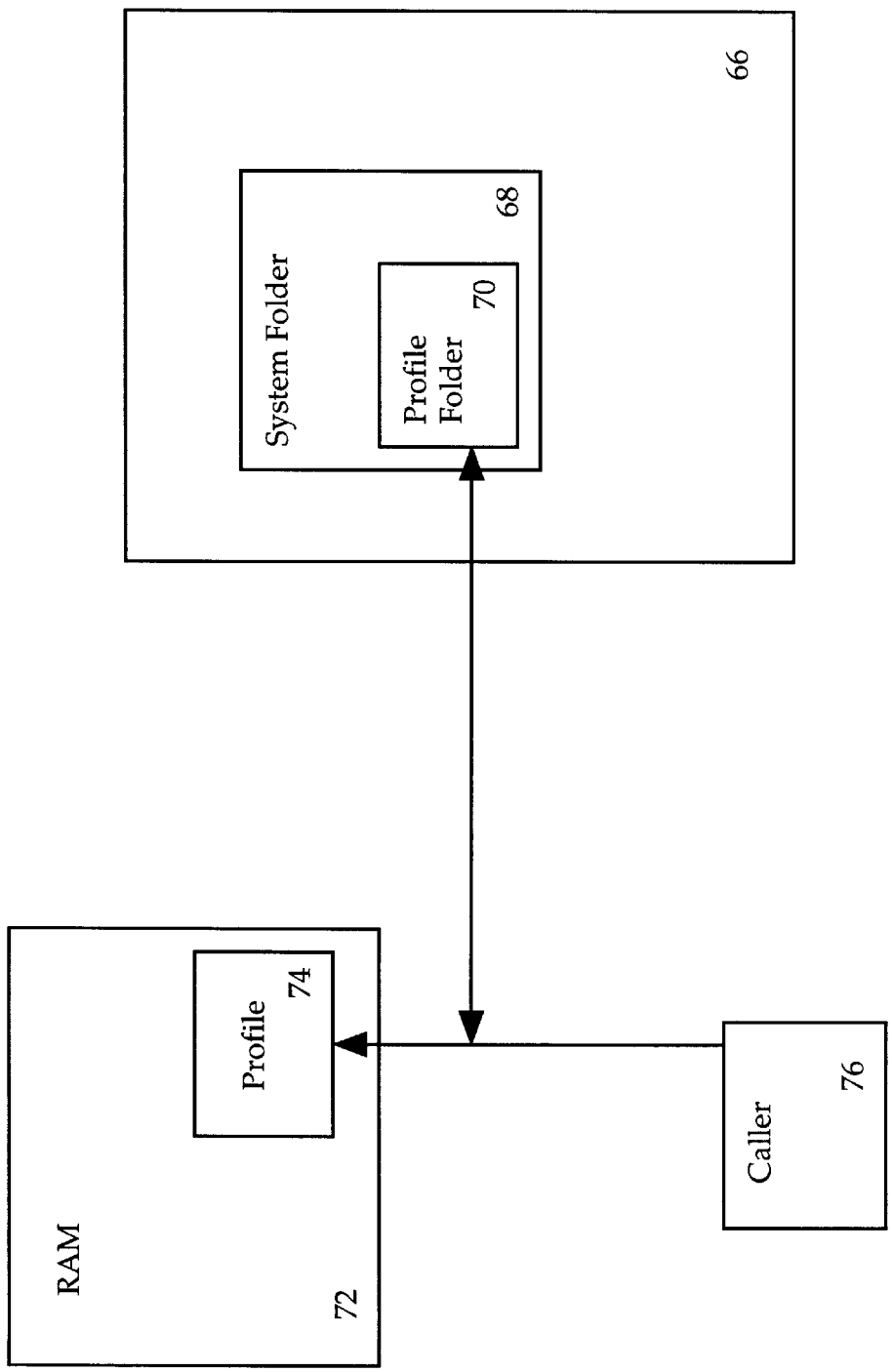
FIG. 5 is a block diagram depicting a method and system for dispatching an element in a device profile according to the present invention.

Referring to FIG. 5, a block diagram depicts a method and system for dispatching an element in a device profile according to the present invention. A first memory 66 preferably contains a system folder 68. Within system folder 68 is a profile folder 70. Profile folder 70 preferably contains at least one device profile that may be used with ColorSync™ 2.0. In the preferred embodiment, first memory 66 is a main memory in a computer system, one example being a hard drive.

A second memory 72 contains at least a portion of a device profile 74. In the preferred embodiment, second memory 72 is any scratch or temporary memory, one example being random access memory (RAM). The portion of device profile 74 within second memory 72 preferably includes header 58, tag table 60, and possibly one element from tagged element data 62, as shown in FIG. 4. When a different element is needed, caller 76 requests a new element and allocates the necessary amount of memory in second memory 72 for the new element. Caller 76 can be a CMM, device driver, application or calibration device.

The call used to request an element is stated below.

```
pascal
CMError
GetProfileElement (Profile prof, OSType tag, long *elementSize, void
    *elementData);
```

In the GetProfileElement call, "Profile prof" is an input parameter that specifies the profile to be accessed. "OSType Tag" is an input parameter that specifies the tag signature for the requested element. "ElementSize" is an input and output parameter, and specifies the size of the element to be copied. "ElementData" is an input and output parameter, and specifies the destination for copying the element. If elementSize is not NULL and elementData is NULL when a call is made, then the size of the element is returned in the *elementSize parameter. If elementSize and elementData are not NULL, then the element is copies to the *elementData parameter. Finally, If elementSize is NULL and elementData is not NULL, the entire element is copied.

The method and system of the present invention provides for other functions regarding elements in tagged element data 62. One function is the ability to determine whether or not an element with a specific tag signature exists in the profile. The call for this function is given below.

```
pascal
CMError
ProfileElementExists(Profile prof, OSType tag, Boolean *found);
```

The parameter "Boolean *found" is an output parameter, and returns a true if the element exists. "Profile prof" and "OSType tag" are defined above.

Another function available in the preferred embodiment provides the ability to access only a part of an element for a specified tag signature. The caller of the function is responsible for allocating memory for storage of the partial element. The call for this function is stated below.

```
pascal
CMError
GetPartialProfileElement (Profile prof, OSType tag, unsigned long
    offset, unsigned long byteCount, void *elementData);
```

The parameter "unsigned long offset" is an input parameter that specifies where to begin the transfer of data within the element. "Unsigned long byteCount" identifies the number of bytes to transfer. "Profile prof", "OSType tag", and "*elementData" are defined above.

A user has the ability to reserve a portion of an element for a specific tag in the preferred embodiment. This function is broken down into two function calls. The first function call is given below.

```
pascal
CMError
SetProfileElementSize(Profile Prof, OSType tag, unsigned long
    elementSize);
```

This call passes parameters that set the size of the element. The parameter "elementSize" is an input parameter that identifies the total byte size to be reserved for data in an element. This first call must be made prior to making the second function call. The second function call is stated below.

```
pascal
CMError
SetPartialProfileElement(Profile prof, OSType tag, unsigned long
    offset, unsigned long byteCount, void *elementData);
```

The second function sets part of an element for the specified tag signature. If desired, the second function call may be repeated until the complete element has been transferred to scratch memory. These two function calls provide the color management system of the preferred embodiment with the ability to access or set portions of the data in an element. Additional functions for profile and element access that are implemented in the preferred embodiment are listed in Appendix 2.

Figure 6:
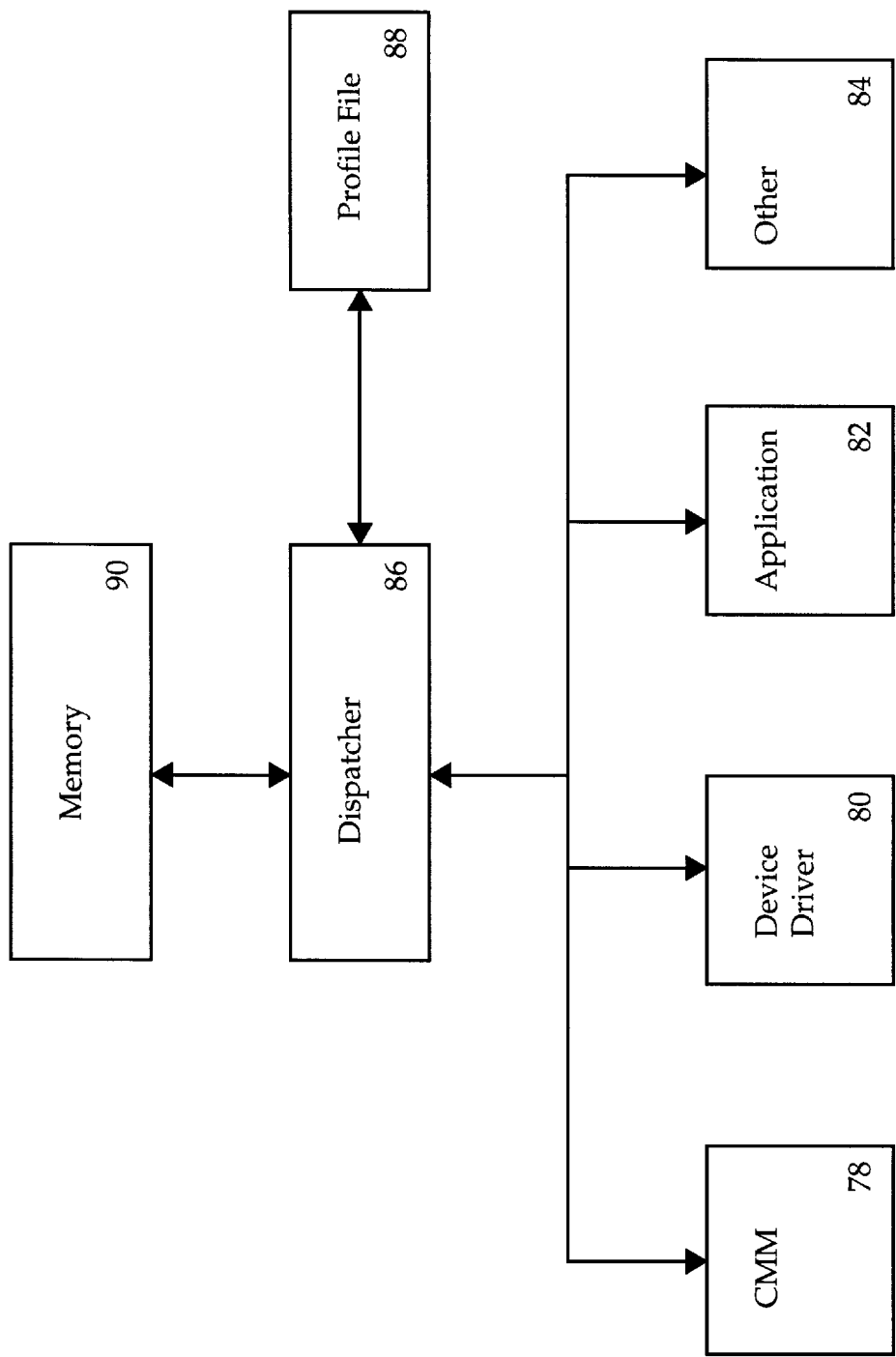
FIG. 6 is a block diagram illustrating a method and system for dynamically dispatching device profile data in a color management system according to the present invention.

The modular architecture of the color management system of the preferred embodiment provides for multiple accesses of the same device profile and manipulation of the device profile, or portions of the device profile, while maintaining the integrity of the device profile. FIG. 6 is a block diagram illustrating a method and system for dynamically dispatching device profile data in a computer system according to the present invention. Multiple devices within a computer system may need to access the same device profile at one time. For example, a CMM 78 may need to access the device profile to obtain an element for color matching, as described with reference to FIG. 5. A device driver 80 may access the same device profile to determine what is the preferred CMM in the device profile. Another access may occur because an application software program 82 wants to know whether or not a specific element exists in the device profile. Additional access to the same device profile may be done by other 84. Other 84 may be any other device or software which wants to access the device profile, such as a calibration device. Other 84 may also be a user who wishes to temporarily modify the device profile.

As discussed above with reference to FIG. 3, dispatcher 86 provides the overall color management administrative framework and manages the interaction between modules within the color management system. Accesses to device profiles are routed through dispatcher 48. Device profiles are preferably stored in a profile file 88 in the main memory of a computer system. If an access to a device profile involves a modification of the device profile, a temporary copy of the modified device profile is stored in a scratch memory 90. Interaction between profile file 88 and scratch memory 90 are handled by dispatcher 86. Modification of the device profile includes adding, deleting or changing one or more elements in the device profile, or changing information in the header or tag table in the device profile.

For example, a user may want color matching to occur when printing a document. However, for this document only, the user wants to use a rendering intent different from the one specified in the device profile. Consequently, the user needs to modify the header in the device profile. This is accomplished via a user interface in the preferred embodiment. A copy of the header with the changed rendering intent flag is stored in scratch memory 90 and referenced when printing the document. The original device profile remains unchanged in profile file 88. Consequently, any other accesses to the header in the same device profile stored in profile file 88 are not affected by the user's temporary modification of the header, since the modified header is stored in scratch memory 90. The modified header will be discarded unless the user requests the device profile be updated.

The method and system for dynamically dispatching device profile data can also be implemented in a computer network. The ability to modify the device profile or its contents while maintaining the integrity of the device profile and its contents is useful in a computer network where multiple computer systems can be using the same files or data. In this situation, one computer system preferably can not update, or make lasting changes to the device profile when other systems are accessing the device profile.

Figure 7A:
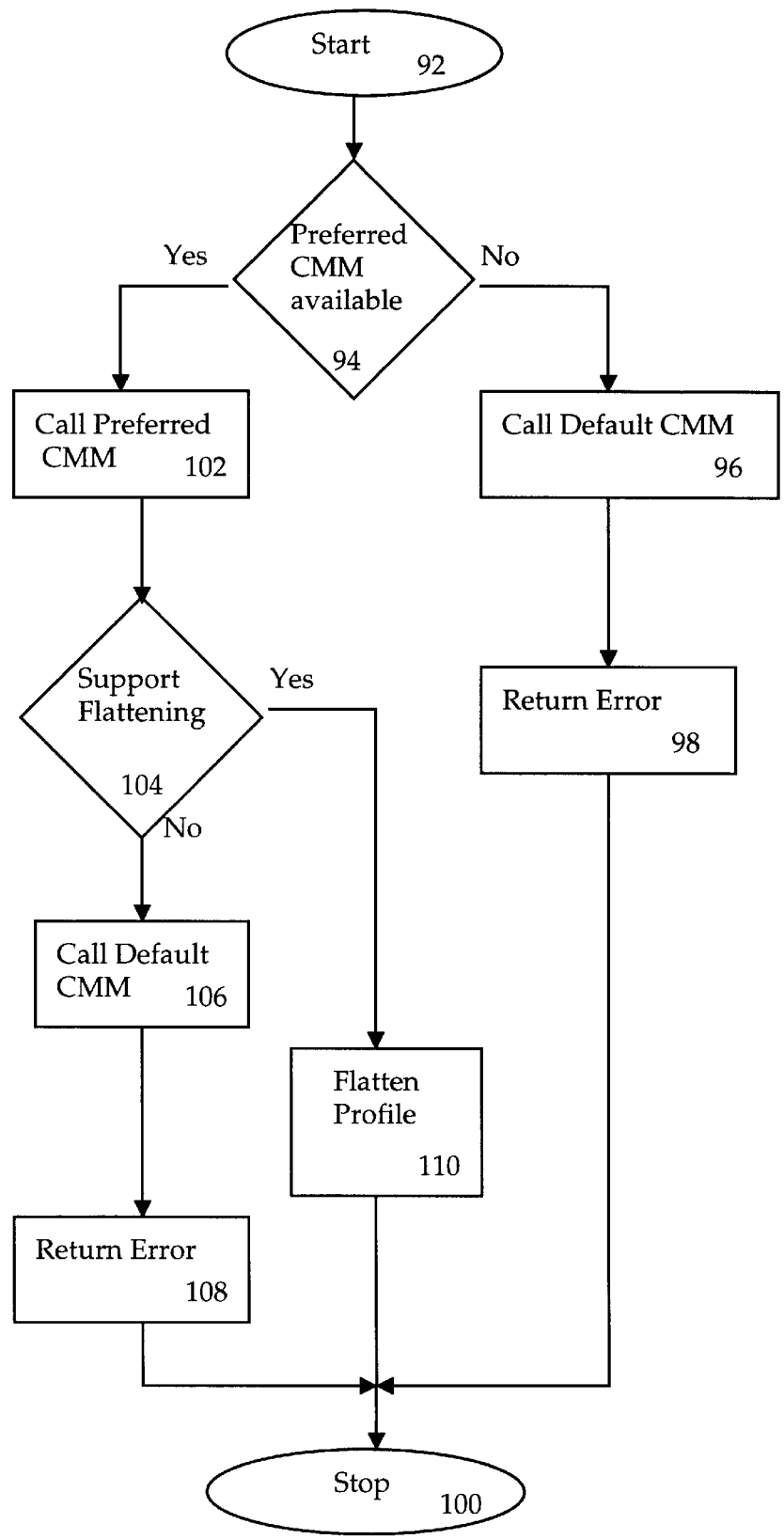
FIGS. 7a–b are flowcharts depicting a method for embedding a device profile into a document according to the present invention.
Figure 7B:
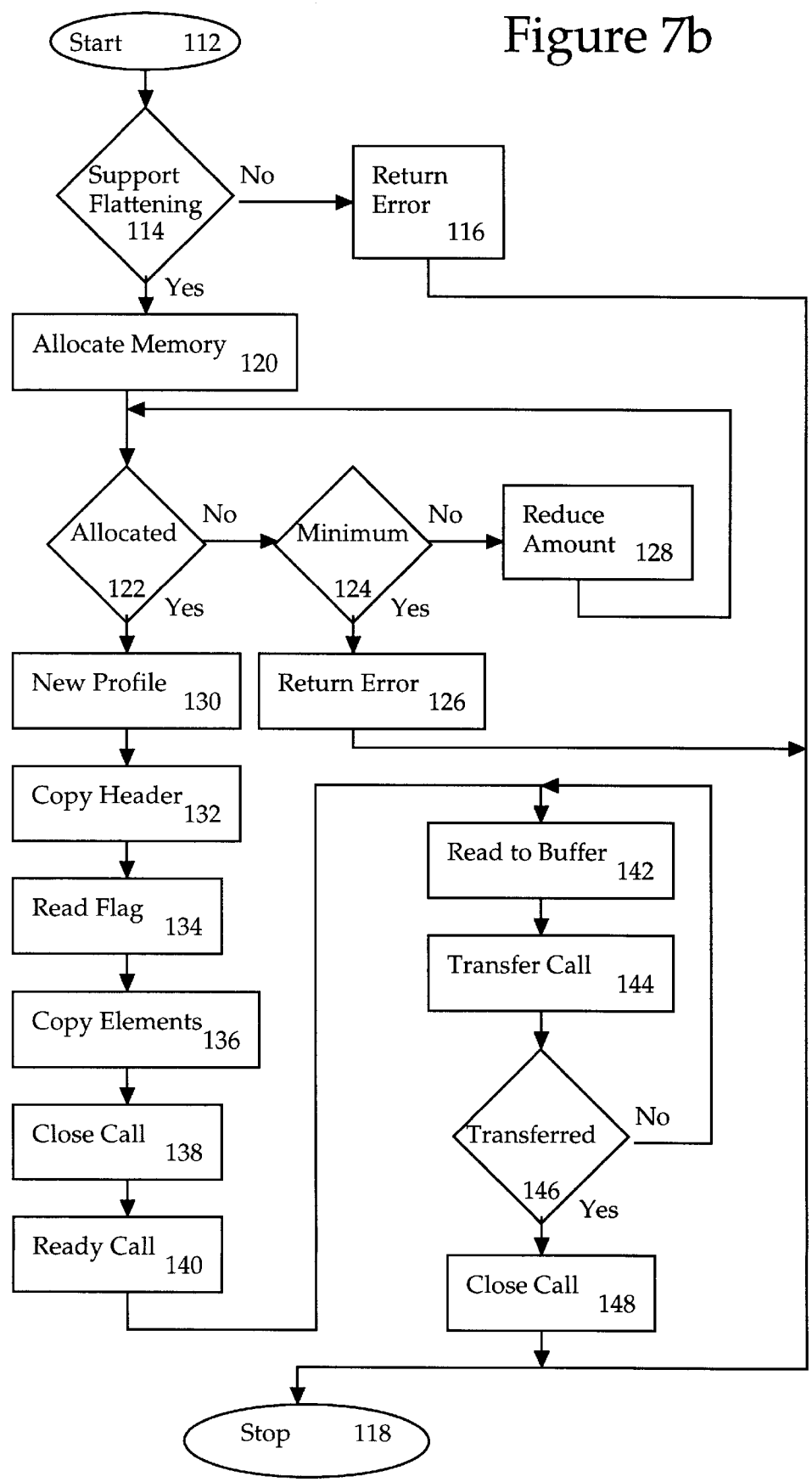

Referring to FIGS. 7a–b, flowcharts depict a method for embedding a device profile into a document according to the present invention. The process of streaming out a disk-based device profile and embedding it into a document is called flattening. FIG. 7a illustrates the steps performed by the dispatcher (block 86 in FIG. 6) when flattening a device profile. The method begins at block 92 with a client requesting that a device profile be flattened. To request flattening, a client uses the following command in the preferred embodiment.

```
pascal
CMError
FlattenProfile(Profile prof, long flags, FlattenProcUPP proc,
    void *refCon)
```

This command is discussed in greater detail in Appendix 2.

The process then passes to block 94, where the dispatcher determines whether or not the preferred CMM is available. The preferred CMM is the CMM that is specified in the device profile. If the preferred CMM is not available, the process passes to block 96, where the Apple-supplied default CMM is called to flatten the device profile. Additionally, an error condition is returned to the client indicating that the preferred CMM is not available. This step is depicted in block 98. The process then stops, as shown in block 100.

Referring again to block 94, if the preferred CMM is available, the dispatcher calls that CMM by making a "CMFlattenProfile" call. This step is shown in block 102. The dispatcher then checks the return code from the CMM to determine whether or not the preferred CMM can flatten the device profile, as depicted in block 104. If the preferred CMM can not flatten the device profile, the dispatcher calls the Apple-supplied default CMM to flatten the profile, and an error condition is returned to the device driver or application software program indicating that the preferred CMM can not flatten the device profile. These steps are illustrated in blocks 106 and 108, respectively. If the preferred CMM can flatten the device profile, the profile is flattened by that CMM, as illustrated in block 110. The process then ends at block 100.

FIG. 7b depicts the steps by a CMM when called to flatten a device profile, as illustrated in block 110 in FIG. 7a. In the preferred embodiment, the command used by the dispatcher to call a CMM is given below.

```
pascal
CMError
CMFlattenProfile(ComponentInstance CMSession, Profile prof,
    long flags, FlattenUPP proc, void *refCon)
```

This command is discussed in greater detail in Appendix 2. The process begins at block 112 with the dispatcher calling a CMM, and thereafter passes to block 114. Block 114 illustrates the determination of whether or not the CMM supports the function of flattening. If the CMM can not flatten the device profile, an error condition is returned to the dispatcher, as shown in block 116. The process then passes to block 118, which depicts the end of the process.

If the CMM can flatten the device profile, the process continues at block 120. Block 120 depicts the allocation of scratch memory, preferably RAM, that will act as a data buffer during the flattening process. Next, a determination is made as to whether or not the buffer allocation is successful, as shown in block 122. If the buffer allocation failed because sufficient RAM is not available, the process passes to block 124, where a determination is made as to whether or not the amount of scratch memory is the minimum amount of memory that can be used as a data buffer. The minimum amount of memory is dependent on the total amount of scratch memory and how much is used up by other tasks. If the amount of scratch memory is less than the minimum, an error condition is returned, as shown in block 126. The process then ends at block 118.

If the amount of scratch memory is not the minimum, the amount of memory requested is reduced, as illustrated in block 128. In the preferred embodiment, the amount of memory allocation is halved. The process then returns to block 122.

Referring again to block 122, if the buffer allocation is successful, a new profile is created by making a "NewProfile" call. This step is shown in block 130. Next, the header is copied into the new profile. Block 132 illustrates this step. The flag passed in the "long flags" parameter of the "FlatenlProfile" command is then read, as shown in block 134. The following flags are available in the preferred embodiment.

| | |
|---|---|
| AtoBElements | Include elements necessary for the source side of a matching session. Common case for a document profile tag |
| BtoAElements | Include elements necessary for the destination side of a matching session |
| intent0 | Include elements necessary for rendering intent 0 |
| intent1 | Include elements necessary for rendering intent 1 |
| intent2 | Include elements necessary for rendering intent 2 |
| qd32KLimit | Flattened CMProfile may not exceed 32K, the limit for QuickDraw PicComments |

Based upon the flag used, the specified elements are copied into the new profile, as shown in block 136. One advantage to the flags is that they allow the elements in the profile to be selectively copied and embedded into a document. This provides a mechanism for choosing the color data which will be included in the new profile.

The process continues at block 138, where a "CloseSpool" command is made. Next, the CMM makes a ready call to the client, as shown in block 140. In the preferred embodiment, the ready call is an "OpenWriteSpool" command. "OpenWriteSpool" informs the client that it needs to set up the data transfer and be ready to write. Block 142 depicts reading the profile into the buffer. The CMM then makes a transfer call to the client, as shown in block 144. The transfer call is preferably a "WriteSpool" command. "WriteSpool" causes the client to check the size of the data stored in the buffer, read the data and send a return after all of the data has been read.

A determination is then made in block 146 as to whether or not the entire profile is flattened. If the device profile is not flattened, the process returns to block 142. If the device profile is flattened, the process continues at block 148, with the CMM making a "CloseSpool" call to the client. "CloseSpool" informs the client that the flattening process is complete. The process then ends at block 118.

Figure 8:
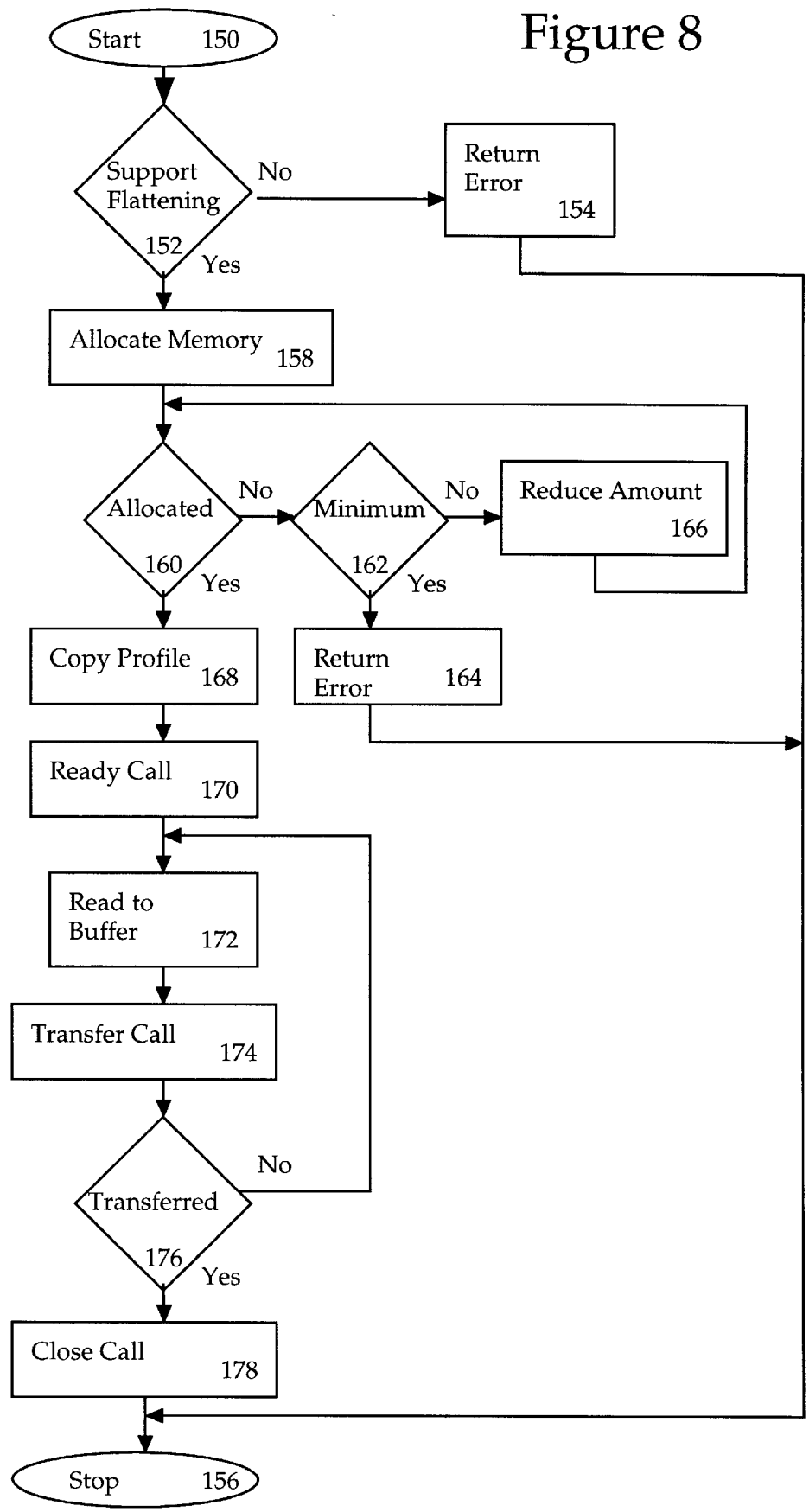
FIG. 8 is a flowchart illustrating an alternative method to the method depicted in FIG. 7b for embedding a device profile into a document according to the present invention.

FIG. 8 is a flowchart illustrating an alternative method to the method depicted in FIG. 7b for embedding a device profile into a document according to the present invention. The dispatcher calls a CMM by making a "CMFlattenProfile" call, as discussed earlier. The step is illustrated in block 150. The process then passes to block 152. Block 152 illustrates the determination of whether or not the CMM supports the function of flattening. If the CMM can not flatten the device profile, an error condition is returned to the dispatcher, as shown in block 154. The process then passes to block 156, which depicts the end of the process.

If the CMM can flatten the device profile, the process continues at block 158. Block 158 depicts the allocation of scratch memory, preferably RAM, that will act as a data buffer during the flattening process. Next, a determination is made as to whether or not the buffer allocation is successful, as shown in block 160. If the buffer allocation failed because sufficient RAM is not available, the process passes to block 162, where a determination is made as to whether or not the amount of scratch memory is the minimum amount of memory that can be used as a data buffer. The minimum amount of memory is dependent on the total amount of scratch memory and how much is used up by other tasks. If the amount of scratch memory is less than the minimum, an error condition is returned, as shown in block 164. The process then ends at block 156.

If the amount of scratch memory is not the minimum, the amount of memory requested is reduced, as illustrated in block 166. In the preferred embodiment, the amount of memory allocation is halved. The process then returns to block 160.

If the buffer allocation is successful, the profile to be flattened is copied into a temporary file. This is accomplished by using the "CopyProfile" command. This step is illustrated in block 168. Next, the CMM sends a ready call to the client, as shown in block 170. In the preferred embodiment, the ready call is an "OpenWriteSpool" command. As discussed earlier, "OpenWriteSpool" informs the client that it needs to set up the data transfer and be ready to write.

Block 172 depicts reading the profile into the buffer. The CMM then makes a transfer call to the client, as shown in block 174. The transfer call is preferably a "WriteSpool" command. "WriteSpool" causes the client to check the size of the data stored in the buffer, read the data and send a return after all of the data has been read.

A determination is made in block 176 as to whether or not the entire profile is flattened. If the device profile is not flattened, the process returns to block 172. If the device profile is flattened, the process continues at block 178, with the CMM making a "CloseSpool" call to the client. "CloseSpool" informs the client that the flattening process is complete. The process then ends at block 156.

Figure 9A:
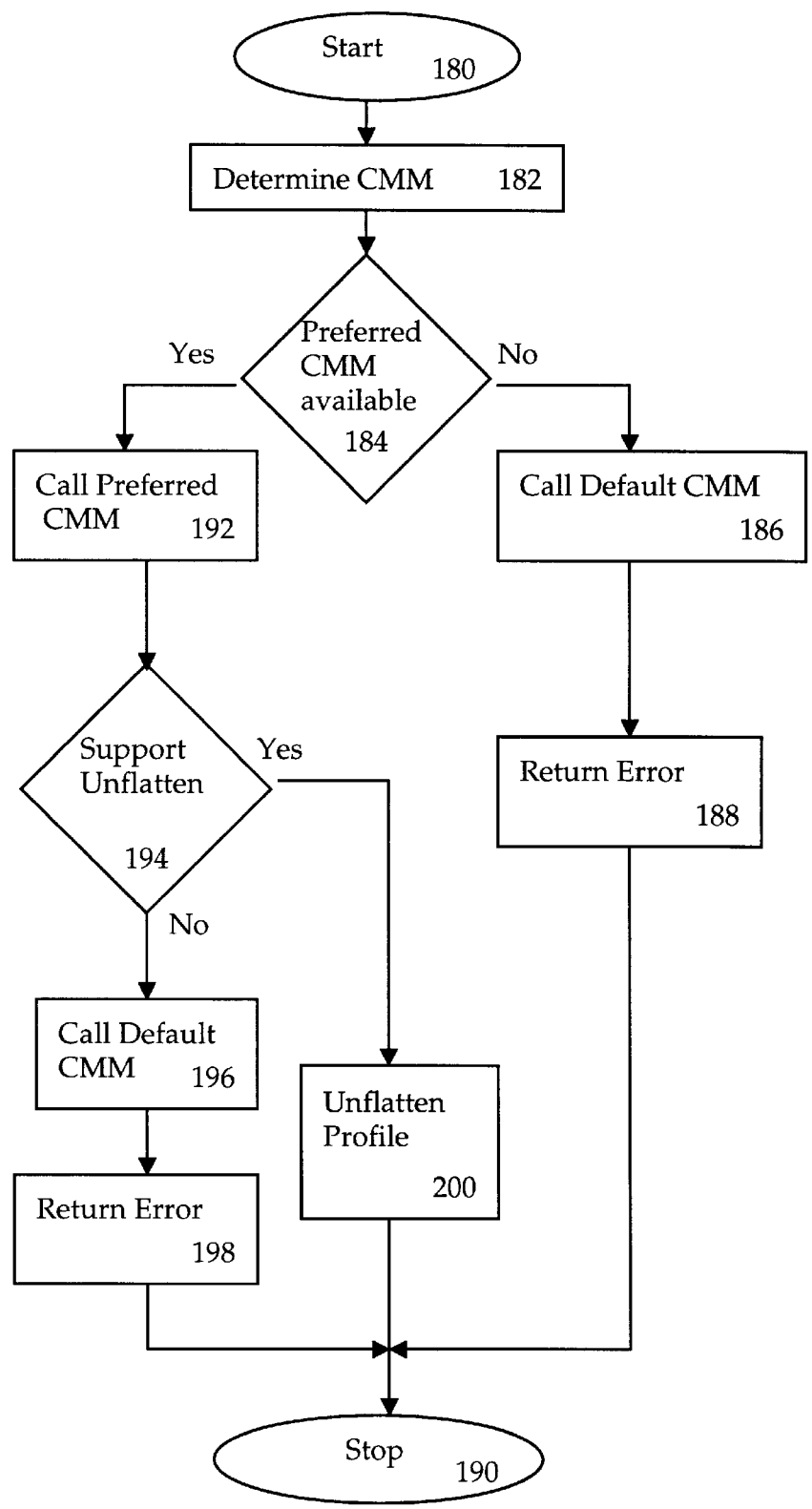
FIGS. 9a–b are flowcharts illustrating a method for extracting a device profile from a document according to the present invention.
Figure 9B:
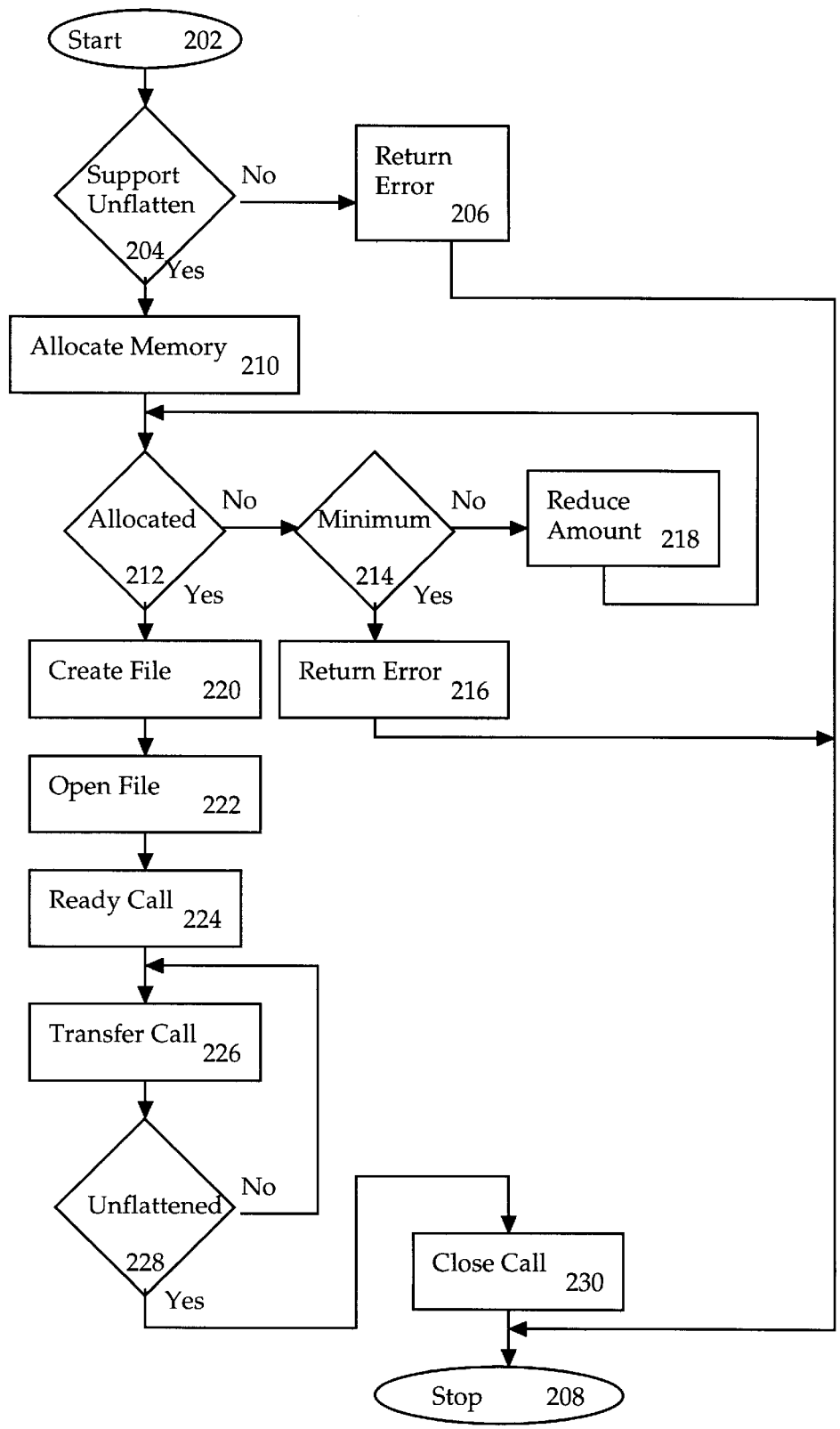

FIGS. 9a–b are flowcharts illustrating a method for extracting a device profile from a document according to the present invention. The process of extracting, or reading out, an embedded device profile and reconstructing it as a disk-based device profile is called unflattening. Referring to FIG. 9a, the steps performed by the dispatcher (block 86 in FIG. 6) for unflattening a device profile are illustrated. The method begins at block 180 with a client requesting that a device profile be unflattened. The command preferably used by a client to request unflattening is given below.

```
pascal
CMError
UnflattenProfile(FSSpec *resultFileSpec, FlattenProcUPP proc,
   void *refCon)
```

This command is discussed in greater detail in Appendix 2. The process then passes to block 182, where the dispatcher determines the preferred CMM. The dispatcher does this by sending an "OpenReadSpool" command followed by a "ReadSpool" command and reading the first 8 bytes to determine the preferred CMM.

A determination is then made as to whether or not the preferred CMM is available, as shown in block 184. If the preferred CMM is not available, the process passes to block 186, where the Apple-supplied default CMM is called to unflatten the device profile. Additionally, an error condition is returned to the device driver or application indicating that the preferred CMM is not available. This step is depicted in block 188. The process then stops, as shown in block 190.

Referring again to block 184, if the preferred CMM is available, the dispatcher calls that CMM. This step is shown in block 192. The dispatcher then checks the return code from the CMM to determine whether or not the preferred CMM can unflatten the device profile, as depicted in block 194. If the preferred CMM can not unflatten the device profile, the dispatcher calls the Apple-supplied default CMM to unflatten the profile, and an error condition is returned to the device driver or application software program indicating that the preferred CMM can not unflatten the device profile. These steps are illustrated in blocks 196 and 198, respectively. If the preferred CMM can unflatten the device profile, the profile is unflattened by that CMM, as illustrated in block 200. The process then ends at block 190.

FIG. 9b depicts the steps performed by a CMM when called to unflatten a device profile, as illustrated in block 200 in FIG. 9a. In the preferred embodiment, the command used by the dispatcher to call a CMM is given below.

```
pascal
CMError
CMUnflattenProfile(ComponentInstance CMSession, Profile *prof,
    FlattenUPP proc, void *refCon)
```

This command is discussed in greater detail in Appendix 2. The process begins at block 202, and thereafter passes to block 204. Block 204 illustrates the CMM's determination of whether or not it supports the function of unflattening. If the CMM can not unflatten the device profile, an error condition is returned, as shown in block 206. The process then ends at block 208.

If the CMM can unflatten the device profile, the process continues at block 210, with the allocation of scratch memory, such as RAM, that will be a data buffer during unflattening of the device profile. Next, a determination is made as to whether or not the buffer allocation is successful, as shown in block 212. If the buffer allocation failed, the process passes to block 214, where a determination is made as to whether or not the amount of memory requested is the minimum amount of memory that can be allocated as a data buffer. If the amount of memory is the minimum, an error condition is returned, as shown in block 216. If the amount of memory is not the minimum, the requested amount of memory is reduced as illustrated in block 218. In the preferred embodiment, the amount of memory is halved. The process then returns to block 212.

If the buffer allocation is successful, the CMM creates a file with a unique file name, as shown in block 220. This file will be used to store the profile when unflattened. The CMM then opens the file and makes an ready call, as depicted in blocks 222 and 224, respectively. The ready call alerts the client to set up the data transfer and be ready to send. In the preferred embodiment, the ready call is the "OpenRead-Spool" command.

Block 226 illustrates the next step, when the CMM makes a transfer call. This call is "ReadSpool" in the preferred embodiment, and causes the client to check the size of the data buffer and copy the embedded profile into the data buffer. The data is then written into the file by the CMM. The CMM determines whether or not the profile has been unflattened, as shown in block 228. If not, the process returns to block 226.

If the profile has been unflattened, block 230 illustrates the next step, where the CMM makes a close call. In the preferred embodiment, the close call is "CloseSpool". The CMM then returns the newly created profile file specification to the client. The process then ends, as shown in block 208.

One of the advantages of the preferred embodiment in the flatten and unflatten procedures is that the dispatcher always attempts to find and use the preferred CMM first. This provides at least two benefits. One, the preferred CMM is the CMM that will most likely be the one to perform color matching. It knows what profile elements are required to achieve high quality and high performance color transformations. Second, some of the custom profile elements may be too large to be embedded into the document. However, the CMM can store the larger elements in an external file or a network location and retrieve them when the profile is unflattened. In this manner, the custom or private data stored in a profile is not lost forever when the profile is flattened.

While the invention has been particularly shown and described with reference to a preferred embodiment, it will be understood by those skilled in the art that various changes in form and detail may be made therein without departing from the spirit and scope of the invention.

What is claimed is:

1. A method for flattening a device profile into a document in a system having at least one device profile and at least one color matching method that can flatten device profiles, comprising the steps of:
   allocating a memory buffer;
   reading a portion of the device profile into the memory buffer;
   transferring the portion of the device profile in the memory buffer to the document; and
   if necessary, repeating the steps of reading and transferring portions of the device profile until the desired portions of the device profile are embedded in the document.

2. In a color management system having a default color matching method, a client, and at least one device profile which may specify a preferred color matching method, wherein additional color matching methods other than the default color matching method may be added to or deleted from the color management system, a method for dispatching a color matching method to flatten a device profile, comprising the steps of:
   determining whether or not a preferred color matching method is included within the color management system;
   if the preferred color matching method is included in the color management system, determining whether or not the preferred color matching method can flatten the device profile;
   if the preferred color matching method can flatten the device profile, dispatching the preferred color matching method to flatten the device profile; and
   if the preferred color matching method is not included in the color management system, or the preferred color matching method can not flatten the device profile, dispatching the default color matching method to flatten the device profile.

3. A method for unflattening a device profile in a system having at least one device profile and at least one color matching method that can unflatten device profiles, comprising the steps of:
   allocating a memory buffer;
   creating a file in the memory buffer to store the device profile;
   writing a portion of the device profile into the file; and
   if necessary, repeating the step of writing a portion of the device profile into the file until the desired portions of the device profile have been transferred to the file.

4. In a color management system having a default color matching method, a client, and at least one device profile which may specify a preferred color matching method, wherein additional color matching methods other than the default color matching method may be added to or deleted from the color management system, a method for dispatching a color matching method to unflatten a device profile, comprising the steps of:

accessing the device profile to identify a preferred color matching method;

determining whether or not the preferred color matching method is included within the color management system;

if the preferred color matching method is included in the color management system, determining whether or not the preferred color matching method can unflatten the device profile;

if the preferred color matching method can unflatten the device profile, dispatching the preferred color matching method to unflatten the device profile; and if the preferred color matching method is not included in the color management system, or the preferred color matching method can not unflatten the device profile, dispatching the default color matching method to unflatten the device profile.

5. A color management system for flattening a device profile, comprising:

a client to send a flatten profile command;

a dispatcher to receive the flatten profile command; and a color matching method that supports flattening, wherein upon receipt of the flatten profile command the dispatcher dispatches the color matching method to flatten the device profile.

6. A color management system for unflattening a device profile, comprising:

a client to send an unflatten profile command;

a dispatcher to receive the unflatten profile command; and a color matching method that supports unflattening, wherein upon receipt of the unflatten profile command the dispatcher dispatches the color matching method to unflatten the device profile.

7. The method of claim 1, further comprising the step of reducing the amount of memory buffer to be allocated by a certain amount when the step of allocating the memory buffer fails due to an insufficient amount of available buffer space.

8. The method of claim 7, wherein the certain amount is a half.

9. The method of claim 2, further comprising the step of returning an error message when the preferred color matching method is not available.

10. The method of claim 2, further comprising the step of returning an error message when the preferred color matching method is not able to flatten the device profile.

11. The method of claim 3, further comprising the step of reducing the amount of memory buffer to be allocated by a certain amount when the step of allocating the memory buffer fails due to an insufficient amount of available buffer space.

12. The method of claim 11, wherein the certain amount is a half.

13. The method of claim 4, further comprising the step of returning an error message when the preferred color matching method is not available.

14. The method of claim 4, further comprising the step of returning an error message when the preferred color matching method is not able to unflatten the device profile.

15. A method for flattening a device profile in a system having at least one device profile and at least one color matching method that can flatten device profiles, comprising the steps of:

allocating a buffer for storing at least a portion of the device profile during the flattening process;

creating a new device profile in the buffer;

copying a header from the device profile into the new device profile;

copying a portion of the elements from the device profile into the new device profile;

transferring the copied header and elements from the buffer into a document, wherein the transfer is performed in at least one step; and if necessary, repeating the steps of copying and transferring until the desired elements of the device profile have been transferred to the new device profile, wherein the device profile is then embedded in the document.

16. The method of claim 15, further comprising the step of determining which elements to be copied before performing the step of copying at least a portion of the elements from the device profile to be flattened into the new device profile.

17. The method of claim 16, wherein the step of determining which elements to be copied comprises determining the state of a flag.

18. The method of claim 15, further comprising the step of reducing the amount of buffer to be allocated by a certain amount when the step of allocating the buffer fails due to an insufficient amount of available buffer space.

19. The method of claim 18, wherein the certain amount is a half.

20. A system for flattening a device profile, wherein at least one color matching method is associated with the system that can flatten device profiles, said system comprising:

at least one device profile;

a buffer for storing at least a portion of the device profile during the flattening process;

means for transferring a portion of the device profile into the buffer;

means for transferring the portion of the device profile in the buffer to a document; and if necessary, means for repeating the transferring steps until all of the desired portions of the device profile have been transferred to the document, wherein the device profile is then embedded in the document.

21. The system of claim 20, further comprising a memory for storing all of the device profiles in a single location.

22. The system of claim 21, wherein the memory is a read only memory (ROM).

23. The system of claim 20, wherein the buffer is a random access memory (RAM).

24. A system for unflattening a device profile embedded in a document, wherein at least one color matching method is associated with the system that can unflatten device profiles, said system comprising:

a buffer for storing at least a portion of the device profile during the unflattening process;

means for transferring a portion of the device profile from the document into the buffer, wherein the transfer is performed in at least one step; and if necessary, means for repeating the step of transferring a portion of the device profile until the desired portions of the device profile have been transferred to the buffer, wherein the device profile is extracted from the document and reconstructed in the buffer.

25. The system of claim 24, wherein the buffer is a random access memory (RAM).

* * * * *